United States Patent
Sundaresan

(10) Patent No.: US 6,910,029 B1
(45) Date of Patent: Jun. 21, 2005

(54) SYSTEM FOR WEIGHTED INDEXING OF HIERARCHICAL DOCUMENTS

(75) Inventor: Neelakantan Sundaresan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 539 days.

(21) Appl. No.: 09/510,054

(22) Filed: Feb. 22, 2000

(51) Int. Cl.$^7$ .............................................. G06F 17/30
(52) U.S. Cl. .............................. 707/2; 707/3; 707/102; 709/203; 709/219
(58) Field of Search .............................. 707/5, 513, 2, 707/3, 102; 709/203, 218, 219

(56) References Cited

U.S. PATENT DOCUMENTS

| | | | | |
|---|---|---|---|---|
| 5,111,384 A | * | 5/1992 | Aslanian et al. | 706/45 |
| 5,893,101 A | * | 4/1999 | Balogh et al. | 358/1.1 |
| 5,983,176 A | * | 11/1999 | Hoffert et al. | 704/231 |
| 5,991,459 A | * | 11/1999 | Fogel | 382/264 |
| 6,151,624 A | * | 11/2000 | Teare et al. | 707/5 |
| 6,199,081 B1 | * | 3/2001 | Meyerzon et al. | 707/13 |
| 6,208,988 B1 | * | 3/2001 | Schultz | 707/100 |
| 6,240,407 B1 | * | 5/2001 | Chang et al. | 707/1 |
| 6,295,529 B1 | * | 9/2001 | Corston-Oliver et al. | 707/3 |
| 6,345,288 B1 | * | 2/2002 | Reed et al. | 707/1 |
| 6,351,755 B1 | * | 2/2002 | Najork et al. | 707/501.1 |
| 6,353,823 B1 | * | 3/2002 | Kumar | 707/102 |
| 6,389,412 B1 | * | 5/2002 | Light | 707/3 |
| 2002/0013782 A1 | * | 1/2002 | Ostroff et al. | 707/10 |

OTHER PUBLICATIONS

K. Selcuk Candan, Huan Liu, and Reshma Suvarna, Resource Description Framework: Metadata and Its Applications, SIGKDD Explorations, vol. 3, pp. 6–18.*

Publication: "An Efficiently Updatable Index Scheme for Structured Documents." Kanemoto et al. IEEE. pp. 991–996. 1998.

Publication: "An Indexing Model for Structured Documents to Support Queries on Content, Structure and Attributes" Dao. IEEE. pp. 89–97. 1998.

* cited by examiner

*Primary Examiner*—Luke S Wassum
*Assistant Examiner*—Leslie Wong
(74) *Attorney, Agent, or Firm*—John L. Rogitz

(57) ABSTRACT

Metadata files representing Web document content are parsed in accordance with a specification file, with a specification file being generated for each class of documents, e.g., HTML pages, newsgroup articles, and JAVA programs. Each specification file has the same format, i.e., schema, as a metadata file for the associated document class. Within each specification file, each element in the hierarchy is associated with a weight. When a metadata file is received, both the metadata file and the specification file are walked through top-down to parse data out of the metadata file into an index file in accordance with the weights in the specification file, e.g., a data element having a weight of zero is not written to the index file, an element with a weight of two is written out twice to the index file, and so on. Importantly, the tags in the metadata file are not written out to the index file. The index file is then used by an index engine to build an index, which can then be accessed by a query executor to respond to a user query for Web documents without having to search through an index containing tags and other data that is irrelevant to the search.

21 Claims, 2 Drawing Sheets

OVERALL FLOW

SYSTEM ARCHITECTURE

OVERALL FLOW

SYSTEM FOR WEIGHTED INDEXING OF HIERARCHICAL DOCUMENTS

BACKGROUND OF THE INVENTION

1. Field of the Invention

The present invention relates generally to indexing Web-based hierarchical documents for search.

2. Description of the Related Art

Millions of documents such as but not limited to hypertext markup language (HTML) documents and extensible markup language (XML) documents exist on the World Wide Web, with the Web documents being accessible to user computers via the Internet. In light of the immense number of documents that are accessible, an essential part of Internet technology is the document search engine. Users can, by means of a search engine, rapidly query for and locate documents of interest.

Typically, a search engine has three main parts. The first part is a crawler, which accesses Web documents and gathers information about the documents. The information is summarized either by the document producer or by the crawler, with each summary being arranged in a hierarchy and being referred to as "metadata". The metadata is "marked up" by means of tags, i.e., each item of information in the hierarchy is labelled by a corresponding tag, to identify the item of information.

Once the crawler has generated the metadata, an index engine indexes the metadata. The index essentially is a catalogue of the metadata. Then, a query executor portion of the search engine responds to a user query by accessing the indexed metadata and returning the names (also referred to as "uniform resource locators", or URLs) of documents that satisfy the query.

The focus of the present invention is on the indexing phase of a search engine. As recognized by the present invention, the metadata that a crawler creates includes not only data about document content, which is useful to a query executor during the search phase, but also includes internally useful information such as the name of the crawler, date of the crawl, and so on. Moreover, as noted above the metadata summary is marked up with tags that identify the various elements in the summary.

As understood herein, the tags (as opposed to the information identified by the tags) and the internally useful information are not necessarily useful to the query executor, but rather, in the context of the query phase, constitute noise. Moreover, the present invention understands that, depending on the document type, some information as identified by the tags happens to be more useful in the context of the query phase than other information. Unfortunately, as recognized by the present invention current indexing engines do not separate tags from the data identified by the tags, nor do they provide a means for weighting relatively important information more highly than less important information, nor do they provide a means for eliminating completely useless (from a query execution standpoint) information from the index. Thus, the present invention understands that current indexing engines do not optimize the subsequent performance of query executors. The present invention recognizes the above-noted problems and provides the solutions disclosed herein.

SUMMARY OF THE INVENTION

A general purpose computer is programmed according to the inventive steps herein to authenticate a user to plural accounts. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

Thus, the invention can be implemented by a computer system including a general purpose computer and logic executable by the computer for undertaking method acts. These method acts include receiving metadata representing at least one document that is accessible via a wide area computer network. The metadata includes plural elements, and the method embodied by the logic includes weighting at least some elements in accordance with a weighting scheme to render weighted metadata. Also, the logic provides the weighted metadata to an index engine.

In a preferred embodiment, the system can include the index engine, which generates an index based on the weighted metadata, and a crawler that generates the metadata. Also, a query executor can be included to access the index to execute queries for documents.

As set forth in detail below, at least one specification file preferably is generated for at least one respective metadata document class defining a metadata hierarchy. The specification file defines a specification hierarchy that matches the metadata hierarchy. More preferably, plural specification files are generated for respective plural classes.

In accordance with one particularly preferred embodiment, the specification file includes at least one higher element having an associated higher weight and at least one lower element. The lower element is hierarchically lower than the higher element, and the lower element has an associated weight attribute. The lower element has a default weight equal to the higher weight when the weight attribute is null, and otherwise has a weight equal to a value in the weight attribute.

The metadata is arranged in a hierarchical metadata file having plural tags with associated metadata elements. One preferred way in which the weighting is undertaken includes, for each metadata element in the metadata file, accessing a corresponding weight in the specification file. Metadata elements, but not tags, are written out in accordance with the respective weights. Thus, a metadata element is not written out if its respective weight is zero, and a metadata element is written out twice if its respective weight is two.

In another aspect, a computer-implemented method for indexing documents includes generating a specification file for each of a plurality of document classes defining respective metadata hierarchies. Also, the method includes receiving at least one metadata file representative of at least one document, and parsing the metadata file in accordance with the specification file to write out data to an index file in markup language (e.g., HTML or XML) accordance with weights defined by the specification file. No markup tags associated with the data are written out to the index file. The index file can then be sent to an indexing engine of a Web search engine that can be selected from the group including full text indexing engines, value indexing engines, and path expression indexing engines.

In yet another aspect, a computer program device includes a computer program storage device readable by a digital processing apparatus. A program is on the program storage device. The program includes instructions that can be executed by the digital processing apparatus. The program device includes computer readable code means for receiving at least one metadata file representative of a document on the World Wide Web. The metadata file includes tags and associated data elements. Computer readable code means are provided for writing only data elements to an index file, with a data element being written "n" times to the index file wherein "n" is a weight associated with the data element.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
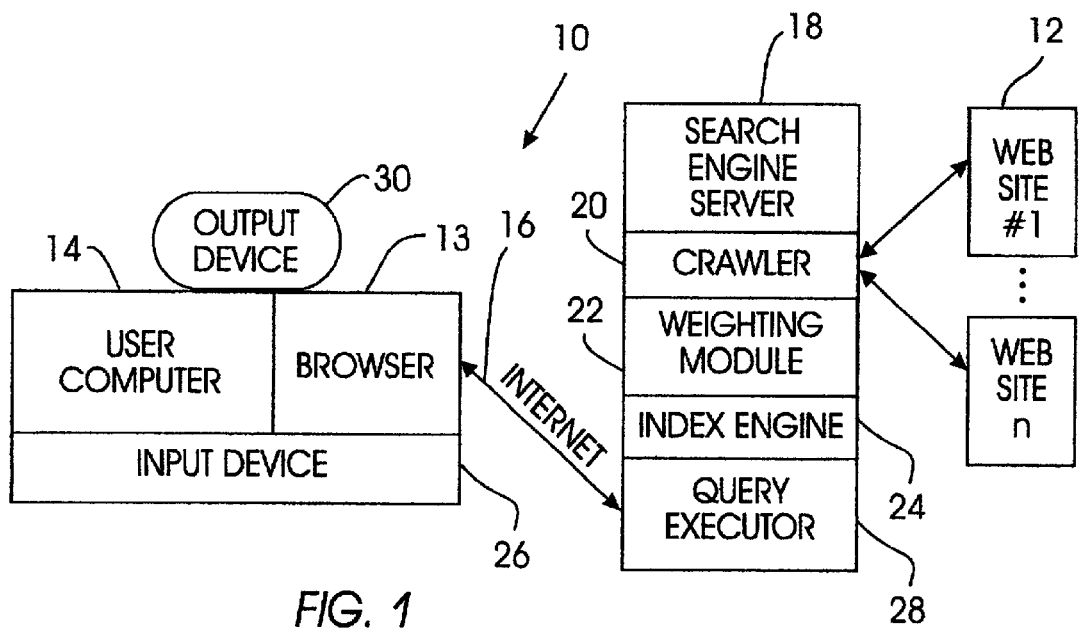
FIG. 1 is a schematic diagram showing the system of the present invention.

Referring initially to FIG. 1, a system is shown, generally designated 10, for weighted indexing of hierarchical documents contained in Web sites 12 that are accessible to software-implemented browsers 13 of user computers 14 via the Internet 16. The hierarchical documents can include various document classes, including HTML pages, XML pages, newsgroup articles, JAVA programs, binary data, images, database data, and so on.

A search engine server 18 also accesses the Web sites 12. In one preferred embodiment, the search engine server 18 can be a GCS server or Hotbot server or other appropriate search engine. Accordingly, the preferred server 18 includes a crawler 20 that crawls the Web sites 12 to generate metadata files representative of the content of the Web sites 12. The metadata files can less preferably be manually generated and made available at a Web site 12.

As shown in FIG. 1, the crawler 20 communicates with a weighting module 22 of the present invention, which weights elements in the metadata files in accordance with a weighting scheme to render an index file representing weighted metadata. The weighting can be conditional, wherein the weight of an element is a function of the weight of another element or elements or wherein the weight of an element otherwise depends on the weight of another element or elements. If the weight of an element is zero, the element is essentially eliminated.

The index file, which can be rendered in the form of an HTML or other markup language document, is then provided to a conventional index engine 24 which generates an index based on the metadata. It is to be understood that while the exemplary embodiment described below is directed to full text indexing, the principles advanced herein apply to various indexing mechanisms, including but not limited to value indexing and path expression indexing, with the below-described specification files being generated in accordance with present principles.

If a user of the user computer 14 generates a request for Web documents using a keyword search entered by means of an input device 26 such as a mouse or keyboard, the request is sent via the Internet 16 to a query executor 28 that is associated with the search engine server 18. The query executor 28 accesses the index to execute the requests (queries) for documents, and returns a list of documents satisfying the request to the user computer 14 for display on an output device 30 such as a monitor or printer. It is to be understood that the computers herein can all be associated with appropriate input and output devices, although only those associated with the user computer 14 are shown for clarity in FIG. 1.

In the particular architecture shown, both the user computer 14 and search server 18 are digital processing apparatus, such as a personal computers made by International Business Machines Corporation (IBM) of Armonk, N.Y., or any other computer, including computers sold under trademarks such as AS400, with accompanying IBM Network Stations. Or, the computers may be Unix computers, or OS/2 servers, or Windows NT servers, or IBM workstations or IBM laptop computers.

As intended by the present invention, the flow charts herein illustrate the structure of the weighting module 22 of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the weighting module 22 may be a computer program that is executed by a processor within the server 18 as a series of computer-executable instructions. In addition to hard drives of the server 18, these instructions may reside, for example, in RAM of the server 18, or the instructions may be stored on a DASD array, magnetic tape, electronic read-only memory, or other appropriate data storage device. In an illustrative embodiment of the invention, the computer-executable instructions may be lines of XML code.

Figure 2:
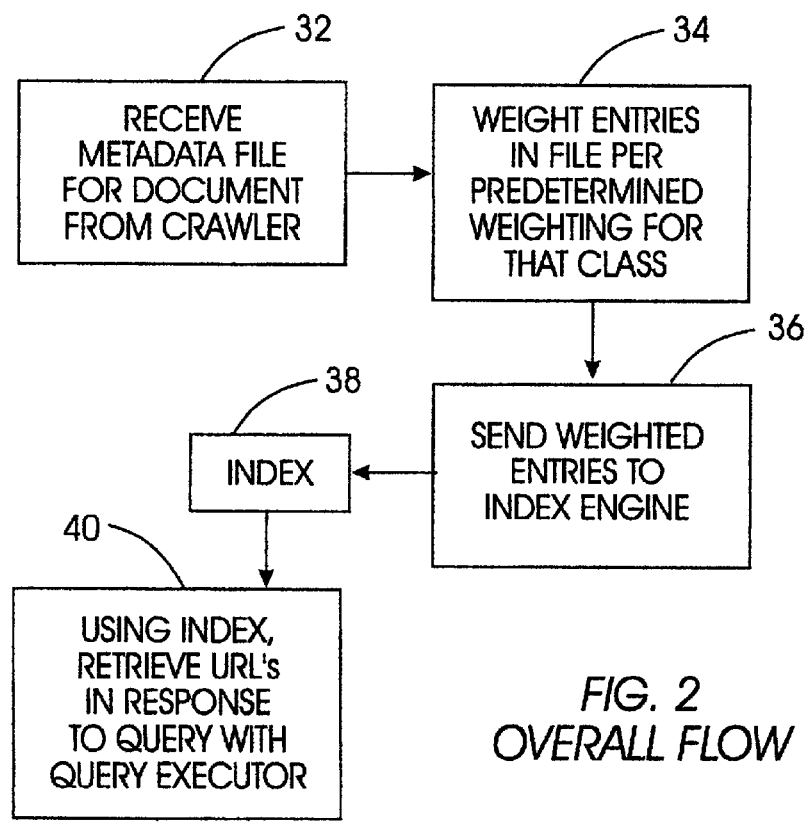
FIG. 2 is a flow chart showing the overall logic.

Now referring to FIG. 2, the overall steps of the present logic can be seen. Commencing at block 32, a hierarchical metadata file is received, preferably from the crawler 20, although it could be received from another source. Moving to block 34, data entries, i.e., elements in the metadata file, are weighted as described further below in accordance with a predetermined scheme for the particular metadata file's class of documents. Essentially, the weighting at block 34 produces weighted metadata which, as more fully disclosed below, preferably is in the form of an HTML-formatted index file. Other formats, including XML, can be used.

At block 36, the weighted metadata is sent to the index engine 24. In accordance with the present invention, the index engine 24 uses the weighted metadata to generate an index at block 38. This index can then be used at block 40 by the query executor 28 to respond to a search request (query) by retrieving URLs of documents that satisfy the request.

Figure 3:
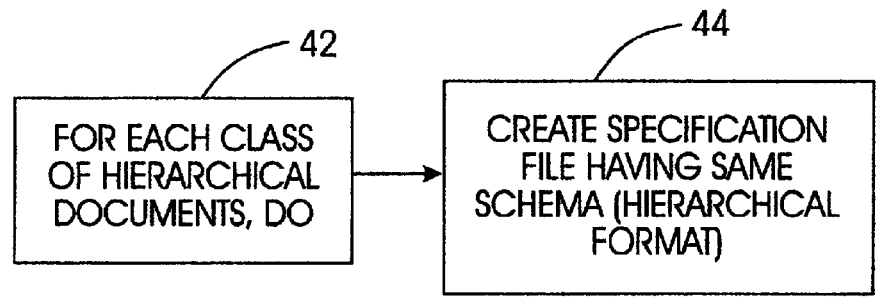
FIG. 3 is a flow chart showing the logic for generating the specification files.
Figure 4:
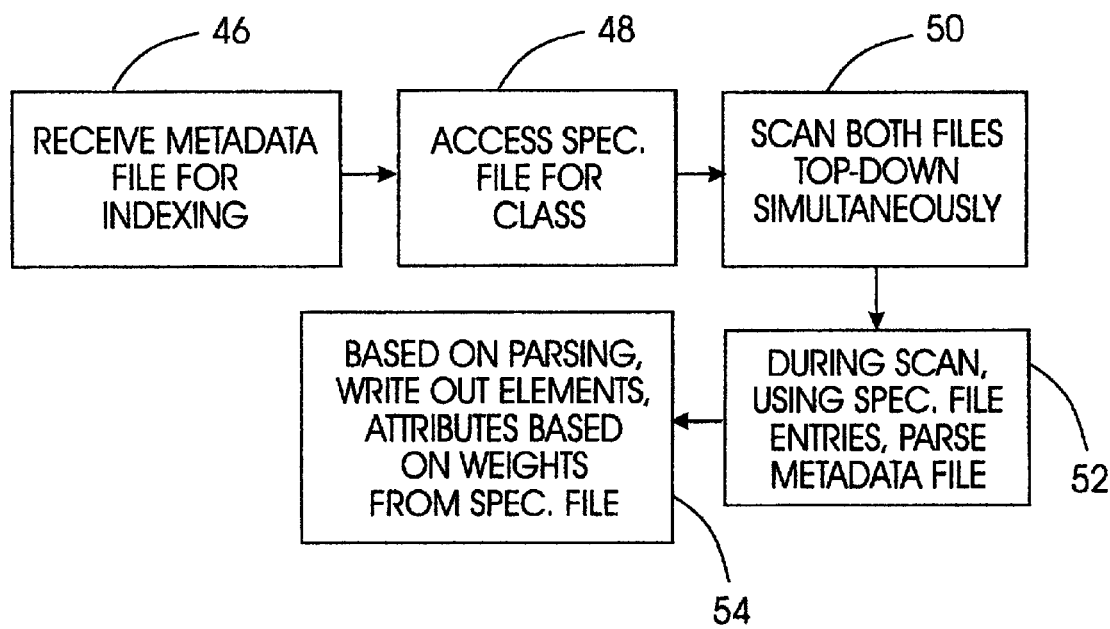
FIG. 4 is a flow chart showing the details of the logic for parsing a metadata file using a specification file.

FIGS. 3 and 4 show the details of how the preferred embodiment undertakes the overall logic of FIG. 2. Commencing at block 42 in FIG. 3, a DO loop is entered for each class of documents. At block 44, a specification file is created for the class under test. The specification file has the same schema, i.e., hierarchical format, as the metadata file for the class under test. Thus, the hierarchy of the specification file matches the hierarchy of the metadata file. In general, the schema for the specification files (in XML) are as follows (for a full-text indexing implementation):

```
<!ELEMENT full-text (element) *>
<!ENTITY % digit "(0|1|2|3|4|5|6|7|8|9)">
<!ENTITY % number "NMTOKEN">
<!ENTITY % boolean "(true|false)">
<!ELEMENT elt (elt | attr | EMPTY) * >
<!ATTLIST elt
    name CDATA #REQUIRED
    count %number; #IMPLIED>
<!ELEMENT attr EMPTY>
<!ATTLIST attr
    name CDATA #REQUIRED
    count %number; #IMPLIED>
```

Accordingly, with the above general schema in mind, the skilled artisan will appreciate that the specification language includes two types of XML elements, i.e., "elt" (the occurrence of an element in a metadata file in the associated document class) and "attr" (the occurrence of an attribute in a metadata file in the associated document class). Both elements "elt" and "attr" have a string attribute, which is required, and a weight attribute, which is optional and which can be conditional, i.e., the weight of one element can depend or be a function of the weight of another element. The string attribute specifies the name of the element or attribute that is being weighted, whereas the weight attribute specifies the weight (in absolute terms or conditional terms as a function of another element) that is to be given to the corresponding "attr" or "elt" element. Since the weight attribute preferably is optional, in the preferred embodiment when the weight attribute is not specified the corresponding element inherits the weight value from the parent node, i.e., the next higher node in the hierarchy.

To illustrate, an exemplary metadata file and associated specification are set forth as follows, with the comments in the metadata file referring to what happens when it is invoked with the specification file below:

```
METADATA FILE
<summary date = "01/01/00"
            by="http://foobar.com">
    <description resource = "http://www.important.com"
            summarizer = "http://www.gcs.ibm.com">
        This string will not occur at all
        <strings>
            This will occur twice
            <seq>
                <L1>This string will occur only once</L1>
            </seq>
        <strings>
    </description>
</summary>
SPECIFICATION FILE
    <?xml version = "1.0" ?>
    <!DOCTYPE full-text SYSTEM "fulltext.dtd">
    <full-text>
        <elt name = "summary" count = "0">
            <elt name = "Description">
                <attr name="resource" count = "1"/>
                <attr name="summarizer" count = "1"/>
                <elt name = "strings" count = "2">
                <elt name="Seq">
                    <elt name = "L1" count="1"/>
                </elt>
                </elt>
            </elt>
        </elt>
    <full-text>
```

The above specification file dictates that the root element, named "summary", has a null weight attribute, i.e., that it has a weight of zero. This means that by default, nothing under it will be indexed, unless the default is overridden. This indeed is the case of "resource" and "summarizer", both of which have weights of one, i.e., the weight attributes of these elements have been provided and are one. On the other hand, "Description" inherits the weight of zero from its parent node "summary", but its child node "strings" does not default to zero, but rather has been associated with a weight of two in its weight attribute. By default, every element under "strings" has a weight of two, e.g., the weight of the element "Seq" is two, unless overridden in accordance with the above principles, e.g., the weight attribute of element "L1", which is a child node of the element "seq", has been provided as one, to override the default weight defined by the parent node "seq".

After passing through the above transformation the following text is rendered, which can then be fed into a full text indexing engine:
http://www.important.com http://www.gcs.ibm.com This will occur twice This will occur twice This string will occur only once.

With the above examples of a metadata file and a specification file in mind, reference is now made to FIG. 4. Commencing at block 46, the metadata file is received for indexing. At block 48 the appropriate specification file for the class of the metadata file is accessed. Then, at block 50 both files are scanned top-down (hierarchically) simultaneously, it being recalled that the specification file is constructed to have the same format as the metadata file for that class.

Proceeding to block 52, during the scan the metadata file is parsed using the specification file, such that only elements and attributes that have a weight of one or more are written out to an index file at block 54 in accordance with the respective weights contained in the specification file. Using the above exemplary files to illustrate, since the resource and summarizer elements in the metadata file have not been provided, they are not written out to the index file. On the other hand, the "L1" element in the metadata file, having a weight of two, is written out twice to the index file, whereas the "strings" element in the metadata file is written out only once, having a weight of one. Thus, the index file appears as:
http://www.important.com http://www.gcs.ibm.com This will occur twice This will occur twice This string will occur only once.

Importantly, none of the markup tags in the metadata file are written to the index file, although they are used in generating the index file. Accordingly, the tags subsequently will not be considered by the query executor, which instead advantageously considers only actual data from the metadata file. Also, higher weights may be given to elements of a particular document class that are more important than other elements in the class, and irrelevant elements (from a query execution standpoint) can be eliminated from the index by assigning these elements a weight of zero. Further, the skilled artisan will now appreciate that entire levels of a hierarchical metadata file can be weighted differently than other levels, while preserving the capability of varying weights within and between levels if desired. Moreover, as stated above the present invention can be used with any indexing protocol, and using one specification file per document class allows element indexing to be tuned to each class. Additionally, the present invention works well with XML/RDF (hierarchical-based and graph-based) encoded material.

While the particular SYSTEM FOR WEIGHTED INDEXING OF HIERARCHICAL DOCUMENTS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

I claim:

1. A computer system, comprising:
   a general purpose computer;
   logic executable by the computer for undertaking method acts comprising:
   receiving metadata representing at least one document accessible via a wide area computer network, the metadata including plural elements;
   weighting at least some elements in accordance with a weighting scheme to render weighted metadata; and
   providing the weighted metadata to an index engine.

2. The system of claim 1, comprising the index engine, the index engine generating an index based on the metadata.

3. The system of claim 2, comprising a crawler sending the metadata to the logic and a query executor accessing the index to execute queries for documents.

4. The system of claim 1, wherein the method acts undertaken by the logic further include:
   generating at least one specification file for at least one respective metadata document class defining a metadata hierarchy, the specification file defining a specification hierarchy matching the metadata hierarchy.

5. The system of claim 4, wherein the method acts undertaken by the logic further include generating plural specification files for respective plural classes.

6. The system of claim 4, wherein the specification file includes at least one higher element having an associated higher weight and at least one lower element, the lower element being hierarchically lower than the higher element, the lower element having an associated weight attribute, the lower element having a default weight equal to the higher weight when the weight attribute is null, the lower element otherwise having a weight equal to a value in the weight attribute.

7. The system of claim 6, wherein the metadata is arranged in a hierarchical metadata file having plural tags with associated metadata elements, and the weighting act undertaken by the logic further includes:
   for each metadata element in the metadata file, accessing a corresponding weight in the specification file; and
   writing out metadata elements but not tags in accordance with the respective weights, wherein a metadata element is not written out if its respective weight is zero and a metadata element is written out twice if its respective weight is two.

8. A computer-implemented method for indexing documents, comprising:
   generating a specification file for each of a plurality of document classes defining respective metadata hierarchies;
   receiving at least one metadata file representative of at least one document;
   parsing the metadata file in accordance with the specification file to write out data to an index file in markup language in accordance with weights defined by the specification file; and
   sending the index file to an indexing engine of a Web search engine, the indexing engine being selected from the group including full text indexing engines, value indexing engines, and path expression indexing engines.

9. The method of claim 8, further comprising indexing data using the index file to render an index and then using the index to execute a query for Web-based documents.

10. The method of claim 8, wherein the specification file includes at least one higher element having an associated higher weight and at least one lower element, the lower element being hierarchically lower than the higher element, the lower element having an associated weight attribute, the lower element having a default weight equal to the higher weight when the weight attribute is empty, the lower element otherwise having a weight equal to a value in the weight attribute.

11. The method of claim 10, wherein the metadata file has plural tags with associated metadata elements, and the method further includes:
   for each metadata element in the metadata file, accessing a corresponding weight in the specification file; and
   writing out metadata elements but not tags in accordance with the respective weights, wherein a metadata element is not written out if its respective weight is zero and a metadata element is written out twice if its respective weight is two.

12. A computer program device comprising:
   a computer program storage device readable by a digital processing apparatus; and
   a program on the program storage device and including instructions executable by the digital processing apparatus, the program comprising:
   computer readable code means for receiving at least one metadata file representative of a document on the World Wide Web, the metadata file including tags and associated data elements; and
   computer readable code means for writing only data elements to an index file, a data element being written "n" times to the index file, wherein "n" is a weight associated with the data element.

13. The device of claim 12, wherein "n" is zero for first elements, one for second elements, and at least two for third elements.

14. The device of claim 12, further comprising computer readable code means for indexing information in the metadata file using the index file to generate an index.

15. The device of claim 14, further comprising computer readable code means for accessing the index to execute a keyword query for Web documents.

16. The device of claim 12, further comprising computer readable code means for generating at least one specification file for at least one respective metadata document class defining a metadata hierarchy, the specification file defining a specification hierarchy matching the metadata hierarchy.

17. The device of claim 16, wherein the specification file includes at least one higher element having an associated higher weight and at least one lower element, the lower element being hierarchically lower than the higher element, the lower element having an associated weight attribute, the lower element having a default weight equal to the higher weight when the weight attribute is empty, the lower element otherwise having a weight equal to a value in the weight attribute.

18. The device of claim 17, wherein the metadata is arranged in a hierarchical metadata file having plural tags with associated metadata elements, and the device further comprises:

computer readable code means for, for each metadata element in the metadata file, accessing a corresponding weight in the specification file; and computer readable code means for writing out metadata elements but not tags in accordance with the respective weights, wherein a metadata element is not written out if its respective weight is zero and a metadata element is written out twice if its respective weight is two.

19. The system of claim 1, wherein a weight of at least a first element is a function of a weight of at least a second element.

20. The method of claim 8, wherein a weight of at least a first element is a function of a weight of at least a second element.

21. The device of claim 12, wherein a weight of at least a first element is a function of a weight of at least a second element.

* * * * *